3,697,415
CATALYTIC HYDROGENATION PROCESS
Walter H. Seitzer, West Chester, Pa., assignor to Sun Oil Company of Pennsylvania, Philadelphia, Pa.
No Drawing. Filed June 25, 1971, Ser. No. 157,017
Int. Cl. C10g 23/02; B01j 11/40
U.S. Cl. 208—143     8 Claims

ABSTRACT OF THE DISCLOSURE

A hydrogenation process for mineral oil by contacting said oil with hydrogen in the presence of a catalyst consisting essentially of a Y-type zeolite molecular sieve containing tin promoted with manganese, vanadium, or zinc. The invention also embodies the catalyst composition used in the process.

---

It is disclosed in the art that tin, alone and in combination with numerous other metals supported on silica, alumina, zirconia, thoria, magnesia, and magnesium hydroxide, has catalytic activity for hydrocracking processes (U.S. 2,911,356, R. A. Hanson, assigned to Union Oil Co., issued Nov. 3, 1959). More recent work (U.S. 3,399,132, B. F. Mulaskey, assigned to Chevron Research Company, issued Aug. 27, 1968) indicates that tin supported on a crystalline zeolitic aluminosilicate is inactive in hydrocarbon conversion processes (e.g. hydrocracking, hydrogenating, isomerization, etc.), although it is a promoter for nickel.

It has now been found that tin is an active catalyst in hydrogenation processes when it is promoted with manganese, vanadium, or zinc, said metal combination being supported on a "Y" type zeolite molecular sieve. This is particularly surprising, since manganese, vanadium, and zinc are inactive as hydrogenation catalyst when supported alone on Y type sieves.

Accordingly, this invention provides a hydrogenation process for a mineral oil fraction boiling above about 300° F. which comprises contacting said mineral oil with hydrogen under hydrogenation conditions and in the presence of a catalyst consisting essentially of a Y-type zeolite molecular sieve containing tin promoted with manganese, vanadium, or zinc. Another embodiment of the invention includes the catalyst composition used for the hydrogenation process, which comprises a Y-type zeolite having associated therewith from about 1% to about 15% by weight of tin promoted with from about 1% to about 15% by weight of manganese, vanadium, or zinc.

The catalysts of this invention may be employed for the hydrogenation of substantially any mineral oil fraction boiling above the conventional gasoline range, i.e., above about 300° F., and usually above about 400° F., and having an end-boiling-point up to about 1000° F., but preferably not greater than about 850° F. These feedstocks may be sulfur-free, or they may contain up to about 5% by weight of sulfur, in the form of organic sulfur compounds. They may also contain organic nitrogen compounds. Specific feedstocks contemplated comprise straight-run gas oils and heavy naphthas, coker distillate gas oils and heavy naphthas, deasphalted crude oils, cycle oils derived from catalytic or thermal cracking operations and the like. These feedstocks may be derived from petroleum crude oils, shale oils, tar sand oils, coal hydrogenation products and the like. Specifically, it is preferred to employ oils having an end-boiling-point between about 400° and 650° F., an API gravity between about 30 and 35°, and containing at least about 20% by volume of aromatic hydrocarbons.

Hydrogenation conditions to be employed in the process of the invention will be within the following ranges:

| | Operative | Preferred |
|---|---|---|
| Temperature, ° C. | 200–460 | 260–400 |
| Pressure, p.s.i.g. | 400–5,000 | 750–2,000 |
| H./oil ratio, s.c.f./B. | 1,000–15,000 | 2,000–10,000 |

The promoted tin catalyst, as indicated, is prepared from commercially available Y-type molecular sieves.

The Y molecular sieves having crystal pore diameters of about 9 to 10 A., and wherein the $SiO_2/Al_2O_3$ ratio is about 4–6, are preferred. The catalyst is prepared from the ammonium form of the sieve which may be obtained by treating the hydrogen form with ammonium chloride and then washing with water until chloride ions are no longer present. The ammonium form of the molecular sieve is then treated with an aqueous solution of a soluble tin compound such as stannous sulfate and subsequently treated with an aqueous solution of the promoter metal salt. Alternatively, the molecular sieve may be treated first with the promoter and then with tin or the tin salt and the promoter metal salt may be mixed in an aqueous solution and used together. In any event, the mixture of salts and zeolite is held at elevated temperature (about 85–95° C.) for several hours and then filtered and dried at about 150° C. During this treatment the tin and promoter ions are absorbed on the zeolite surface. The catalyst is further heated at about 400° C. to 500° C. for about one to three hours to effect activation.

The amount of tin on the molecular sieve may vary from about 1% to about 15% by weight, preferably about 5% to 10% and the promoter ions present will also be in this amount. These amounts of metal on the support is readily controlled by the amount of metal salts in the aqueous treating solutions and by the time treatment, which techniques are known in the art.

In order to further illustrate the invention the following examples are given:

EXAMPLE 1

A commercial Y zeolite (Linde-SK-40) was treated three times with an aqueous solution of ammonium chloride at 80° C. for one-half hour and then washed with water until free of chloride. Then, 100 grams of the ammonium zeolite was stirred in a solution of 25 g. of vanadium pentoxide in 300 ml. of water at 90° C. for six hours. The solids were filtered off, washed, and dried at 140° C. 50 grams of the dried material and 15 g. of stannous sulfate was placed in 300 ml. of water and stirred at 80°–90° C. for four hours. The mass was filtered, washed, and the wet cake slurried at 90° C. for four hours with 200 ml. of water and 200 ml. of saturated ammonium carbonate solution to remove sulfate. After filtering and washing with water, the cake was calcined at 450° C. for four hours to yield the catalyst ready for use.

One part by weight of catalyst and five parts of a slurry oil (petroleum fraction boiling at 550° to 950° F. and containing 1.3% sulfur), were placed in a stirred batch reactor, heated to 400° C. and pressured with hydrogen. The amount of hydrogen absorbed with equivalent to 2800 p.s.i.g. and the product oil contained over 31% by volume of lighter boiling distillate (below 430° F.) and sulfur content of the residue was 1.0%.

EXAMPLE 2

A catalyst was prepared as in Example 1 except that 150 g. of 50% manganese nitrate solution and 150 g. of the ammonium Y-zeolite were contacted in 300 ml. of water. 50 grams of the dried manganese containing zeolite was then treated with 15 g. of stannous sulfate in 200 ml. of water, washed, filtered, treated with carbonate solution, and calcined as in Example 1. The slurry oil was similarly hydrogenated at 400° C. and the amount of hydrogen absorbed was equivalent to 3800 p.s.i.g. Twenty-four percent by volume of the product distilled below 430° F. and sulfur content of the residue was 0.92%.

EXAMPLE 3

To 150 g. of the ammonium Y-zeolite prepared as in Example 1, there was added 300 ml. of water and 45 g. of stannous sulfate. The mixture was stirred overnight at 90° C., filtered, washed, and the wet cake treated with ammonium carbonate solution, filtered, washed, and dried as in Example 1. To 50 g. of the dry tin catalyst as just prepared, 300 ml. of water and 15 g. of zinc nitrate was added and the mixture stirred at 90° C. for 2.5 hours. The mass was filtered, washed with water, and calcined at 425° C. for 2.5 hours.

Slurry oil hydrogenated with this catalyst showed hydrogen uptake to be an amount equivalent to 2800 p.s.i.g. Eleven percent by volume of the product boiled below 430° F. and the residue contained 0.46% sulfur.

EXAMPLE 4

When hydrogenation of slurry oil was carried out with a catalyst of tin only on a Y-zeolite as made in Example 3, less hydrogen activity was observed, the amount of hydrogen uptake ranging from 1600 to 2100 p.s.i.g.

Also, it was determined that manganese and vanadium alone on the Y-zeolite were inert for hydrogenation. When a similar catalyst of zinc alone was used the amount of hydrogen uptake was only 1700 p.s.i.g. Thus, the promoter effects of manganese, vanadium, and zinc are clearly in evidence.

EXAMPLE 5

Example 1 was repeated at 430° C., but using an anthracene oil (a coal tar distillate contained 1% nitrogen and 0.65% sulfur) instead of slurry oil. The hydrogen absorption using the tin-vanadium catalyst was 2900 p.s.i.g. and 16% by volume of product oil boiling below 430° F. was recovered. The nitrogen content of the product oil boiling above 430° F. was 0.34% and its sulfur content was 0.36%.

EXAMPLE 6

Using the catalyst of Example 2 for hydrogenation of anthracene oil at 430° C., an amount of hydrogen uptake equivalent to 2200 p.s.i.g. was observed. When using a similar catalyst containing tin, but without the manganese, the hydrogen uptake measured was only 900 p.s.i.g. Another significant advantage for the manganese containing catalyst in this instance is that it resulted in a product having less than 0.34% nitrogen whereas the run with the tin only catalyst gave a product having 0.55% nitrogen. Also the product from tin-manganese catalyst reaction contained only 0.39% sulfur.

EXAMPLE 7

Using a catalyst of a Y-type molecular sieve prepared as in Example 3, hydrogenation of anthracene oil was carried out to give 11% by volume of a liquid product distilling below 430° F.

It is also significant to note that when a cobalt or molybdenum on Y-zeolite catalyst is used for hydrogenation, the addition of tin significantly reduces catalytic activity. This is true for hydrogenation of both slurry oil and anthracene oil.

The invention claimed is:

1. A hydrogenating process for a mineral oil fraction boiling above about 300° F. which comprises contacting said fraction with hydrogen under hydrogenation conditions and in the presence of a catalyst consisting essentially of a Y-type zeolite molecular sieve containing tin promoted with manganese, vanadium, or zinc.

2. A process as in claim 1 wherein the catalyst is tin promoted with manganese.

3. A process as in claim 1 wherein the catalyst is tin promoted with vanadium.

4. A process as in claim 1 wherein the catalyst is tin promoted with zinc.

5. A catalyst composition consisting essentially of a Y-type zeolite having associated therewith from 1% to 15% by weight of tin and 1% to 15% by weight of manganese, vanadium, or zinc.

6. A composition as in claim 5 wherein the catalyst is tin promoted with manganese.

7. A composition as in claim 5 wherein the catalyst is tin promoted with vanadium.

8. A composition as in claim 5 wherein the catalyst is tin promoted with zinc.

References Cited

UNITED STATES PATENTS

| | | | |
|---|---|---|---|
| 2,911,356 | 11/1959 | Hanson | 208—112 |
| 2,971,903 | 2/1961 | Kimberlin et al. | 208—119 |
| 3,391,075 | 7/1968 | Plank et al. | 208—120 |
| 3,399,132 | 8/1968 | Mulaskey | 252—455 Z |

HERBERT LEVINE, Primary Examiner

U.S. Cl. X.R.

260—667; 252—455 Z; 208—DIG. 2